US007420135B2

(12) United States Patent
Lee et al.

(10) Patent No.: US 7,420,135 B2
(45) Date of Patent: Sep. 2, 2008

(54) MICRO ELECTRO-MECHANICAL SYSTEM SWITCH AND METHOD OF MANUFACTURING THE SAME

(75) Inventors: Sang-hun Lee, Seoul (KR); Soon-cheol Kweon, Seoul (KR); Che-heung Kim, Yongin-si (KR); Hyung-jae Shin, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 367 days.

(21) Appl. No.: 11/322,267

(22) Filed: Jan. 3, 2006

(65) Prior Publication Data

US 2006/0144681 A1 Jul. 6, 2006

(30) Foreign Application Priority Data

Jan. 4, 2005 (KR) ...................... 10-2005-0000314

(51) Int. Cl.

| | |
|---|---|
| ***H01H 57/00*** | (2006.01) |
| ***H01H 21/22*** | (2006.01) |
| ***H01P 1/10*** | (2006.01) |
| *G02B 26/08* | (2006.01) |
| *G02B 26/00* | (2006.01) |

(52) U.S. Cl. ....................... 200/181; 333/105; 333/262; 335/78; 359/224; 359/291

(58) Field of Classification Search ................. 200/181; 333/105, 262; 335/78; 359/224, 290, 291, 359/292, 872

See application file for complete search history.

(56) References Cited

U.S. PATENT DOCUMENTS

| | | | | |
|---|---|---|---|---|
| 7,049,904 | B2 * | 5/2006 | Shin | 333/105 |
| 7,251,069 | B2 * | 7/2007 | Kim et al. | 359/290 |
| 2005/0219017 | A1 * | 10/2005 | Shirakawa | 335/78 |
| 2006/0087716 | A1 * | 4/2006 | Kweon et al. | 359/290 |

* cited by examiner

*Primary Examiner*—David N Spector
(74) *Attorney, Agent, or Firm*—Sughrue Mion, PLLC

(57) ABSTRACT

A micro electro-mechanical system (MEMS) switch and a method for manufacturing the same are provided. The MEMS switch includes a substrate; signal lines formed on the substrate; main electrodes spaced apart by a distance and formed over the substrate; an actuating beam installed above the main electrodes at a certain height; a support unit to support the actuating beam; and sub-electrodes formed above the actuating beam at a distance from the actuating beam and facing the corresponding main electrodes. The method includes depositing and patterning a metal layer on a substrate; depositing and patterning a sacrificial layer to form actuator beam support holes and first sub-electrode contact holes; depositing and patterning an actuating beam layer on the sacrificial layer, thereby forming spacers; depositing and patterning second sub-electrode contact holes from another sacrificial layer; depositing and patterning a sub-electrode layer on the sacrificial layer; and removing the two sacrificial layers.

16 Claims, 14 Drawing Sheets

MICRO ELECTRO-MECHANICAL SYSTEM SWITCH AND METHOD OF MANUFACTURING THE SAME

CROSS-REFERENCE TO RELATED APPLICATION

This application claims benefit under 35 U.S.C. § 119 from Korean Patent Application No. 2005-00314 filed on Jan. 4, 2005 in the Korean Intellectual Property Office, the entire content of which is incorporated herein by reference.

BACKGROUND OF THE INVENTION

1. Field of the Invention

The present invention relates to a Micro Electro-Mechanical System (MEMS) switch and a method of manufacturing the same, and more particularly to an MEMS switch having a three-layer micro-structure (actuating beam) and sub-electrodes, thereby operating at low power, having high thermal stability and preventing short circuits between electrodes, and a method of manufacturing the same.

2. Description of the Related Art

In electronic systems using radio frequency bandwidth, small size, light weight and high performance products are very desirable. Thus, a very small size micro-switch realized by using new technologies has been developed widely to replace semiconductor switches such as Field Effect Transistors (FET) and PIN diodes for use in such electronic systems to control signals.

A switch is the most widely manufactured device out of the Radio Frequency (RF) devices using an MEMS technology. An RF switch is an element frequently applied to an impedance matching circuit or a signal selective transmission circuit in wireless communication terminal devices and systems using a signal in a bandwidth of microwaves or millimeter waves.

U.S. Pat. No. 6,307,169 discloses an MEMS switch which has a hinge for supporting a membrane-type electrode on a substrate. The hinge includes a control electrode coupled to the substrate by an anchor, a hinge collar and a set of hinge arms. The control electrode has a shorting bar coupled thereto and is electrically isolated from another control electrode.

Japanese Patent Laid-Open No. 2001-143595 discloses another MEMS switch which is formed on a substrate using a micro platform structure suspended on a spring suspension. The spring suspension is attached to one end of an anchor structure and extends in a substantially octagonal direction over a signal line. The micro platform has a short bar positioned facing a gap in the signal line. An electrical corset is formed over the signal line to form a capacitor structure which is electrostatically attractable toward a bottom electrode upon application of a selected voltage.

The MEMS switch described above has a drawback in that it needs a large driving voltage because it uses an electrostatic force. Generally, the larger the area of an electrode, the lower the driving voltage. However, increasing the electrode area is a difficult issue because it is also desirable to have a small overall system due to the system downsizing.

Furthermore, the micro-structure, i.e. the membrane-type electrode, disclosed in U.S. Pat. No. 6,307,169 and the micro-platform-type electrode disclosed in Japanese Patent Laid-Open No. 2001-143595, need a reinforcement structure to improve thermal stability and a short circuit prevention structure to prevent a short circuit between electrodes.

SUMMARY OF THE INVENTION

The present invention provides an MEMS switch capable of operating at low power, having high thermal stability and preventing short circuit between electrodes. The present invention also provides a method of manufacturing the MEMS switch described above.

According to an aspect of the present invention, there is provided a micro electro-mechanical system (MEMS) switch, including: a substrate; at least two signal lines formed on the substrate, wherein each has a signal contact portion; at least two main electrodes spaced from each other with a distance and formed over the substrate, the main electrodes disposed between the signal lines and spaced from the signal lines; an actuating beam installed above the main electrodes at a position with a predetermined height so as to do a see-saw motion; a support unit for supporting the actuating beam for enabling the actuating beam to move like a see-saw; and at least two sub-electrodes formed above the actuating beam with a distance between themselves and the actuating beam, and arranged to face the corresponding main electrodes.

The support unit may include spring arms projected from both sides of the actuating beam in the middle portion in the longitudinal direction and spacers coupled to the spring arms, respectively, and vertically formed on the substrate with the predetermined height.

The actuating beam may be a multi-layer structure including a first dielectric layer, a metal layer and a second dielectric layer.

The support unit may include the spring arms extending from a metal layer in the actuating beam, and the spacers coupled to the spring arms, respectively and vertically formed on the substrate with the predetermined height.

The substrate may be further provided with a ground portion which supports a lower part of the spacer and grounds the actuating beam.

The first and second dielectric layers may be formed of silicon nitride SiN.

The metal layer may be formed of Aluminum Al.

The substrate may be a silicon wafer.

The substrate may be further provided with a dielectric layer.

The dielectric layer may be a silicon dioxide $SiO_2$ layer.

The metal layer may have a portion buried in the first dielectric layer, thereby forming a contact portion to be in contact with the signal contact portion.

A dielectric line may be further provided to cover the contact portion, thereby isolating the metal layer from the contact portion.

The signal line, the main electrode and the sub-electrode may be formed of gold Au.

The sub-electrode may comprise a plurality of support parts vertically formed on the substrate with the predetermined height at both sides of actuating beam; and electrode parts supported by the support parts and perpendicularly formed to the actuating beam.

The substrate may be further provided with a contact pad thereon, with which the support part comes to contact.

According to another aspect of the present invention, there is provided a method of manufacturing an MEMS switch, comprising depositing a metal layer on a substrate and patterning the metal layer to form at least two signal lines with signal contact portions, respectively, and at least two main electrodes; depositing a first sacrificial layer with a predetermined thickness on the substrate provided with the signal lines and the main electrodes, and patterning the sacrificial layer to form actuator beam support holes and first sub-electrode contact holes; depositing an actuating beam layer on the first sacrificial layer to fill the actuating beam support holes, thereby forming spacers by the actuating beam layer plugs which are buried portions of the actuating beam layer; patterning the actuating beam layer to be a actuating beam shape; depositing a second sacrificial layer on the first sacrificial layer having the actuating beam layer pattern of the actuating beam shape thereon, and patterning second sub-electrode contact holes; depositing a sub-electrode layer on the second sacrificial layer to fill the first and second sub-electrode contact holes to form support parts by the plugs in the first and second sub-electrode contact holes, and then patterning the sub-electrode layer to be sub-electrode shapes; and removing the first and second sacrificial layers.

Depositing and patterning the actuating beam layer may comprise patterning the actuating beam layer to have a shape corresponding to the actuating beam after depositing the first dielectric layer on the first sacrificial layer; depositing the metal layer on the first dielectric layer and patterning the metal layer to have a shape corresponding to the actuating beam; and depositing the second dielectric layer on the metal layer and patterning the second dielectric layer to have a shape corresponding to the actuating beam.

Depositing and patterning the metal layer may comprise forming the spacers by filling the actuating beam support holes; and patterning the metal layer to form the spring arms so as to be connected to both sides of the metal layer pattern having the actuating beam shape and to the spacers, respectively.

Depositing the metal layer and patterning the metal layer to form the at least two signal lines and at least two sub-electrodes may comprise forming ground portions on the substrate, the ground portions being in contact with the bottom of the spacers and grounding the actuating beam, on the substrate.

Depositing the first dielectric layer on the first sacrificial layer and patterning the first dielectric layer to have a shape corresponding to the actuating beam, may include patterning the first dielectric layer to form contact member through holes, and wherein depositing the metal layer and patterning the metal layer to be the actuating beam shape, may include contact portions by filling the contact member through holes with the metal layer.

Depositing the metal layer on the first dielectric layer and patterning the metal layer to be the actuating beam shape may include forming a dielectric line to isolate the contact portions from the metal layer pattern corresponding to the actuating beam shape.

The method may further comprise forming contact pads for supporting the sub-electrodes on the substrate.

The substrate may be a silicon wafer.

The method may further comprise a step of forming a dielectric layer on the substrate.

The dielectric layer may be silicon dioxide $SiO_2$ layer formed by a thermal oxidation process.

In depositing the metal layer on the substrate and patterning the metal layer to form at least two signal lines, each with a signal contact portion, and at least two main electrodes, the metal layer may be formed of gold and the signal lines and the main electrodes may be patterned by a wet etching process.

The first and second dielectric layers may be formed of silicon nitride, deposited by a PECVD process, and patterned by a dry etching process.

The metal layer may be formed of Aluminum layer, deposited by a sputtering process and patterned by a dry etching process.

The first and second sacrificial layers may be formed of photoresist by a spin coating process or a spray coating process, and patterned by a photolithography process to produce the first and second sub-electrode contact holes.

The first and second sacrificial layers may be removed by an $O_2$ microwave plasma ashing process.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE PRESENT INVENTION

Figure 1:
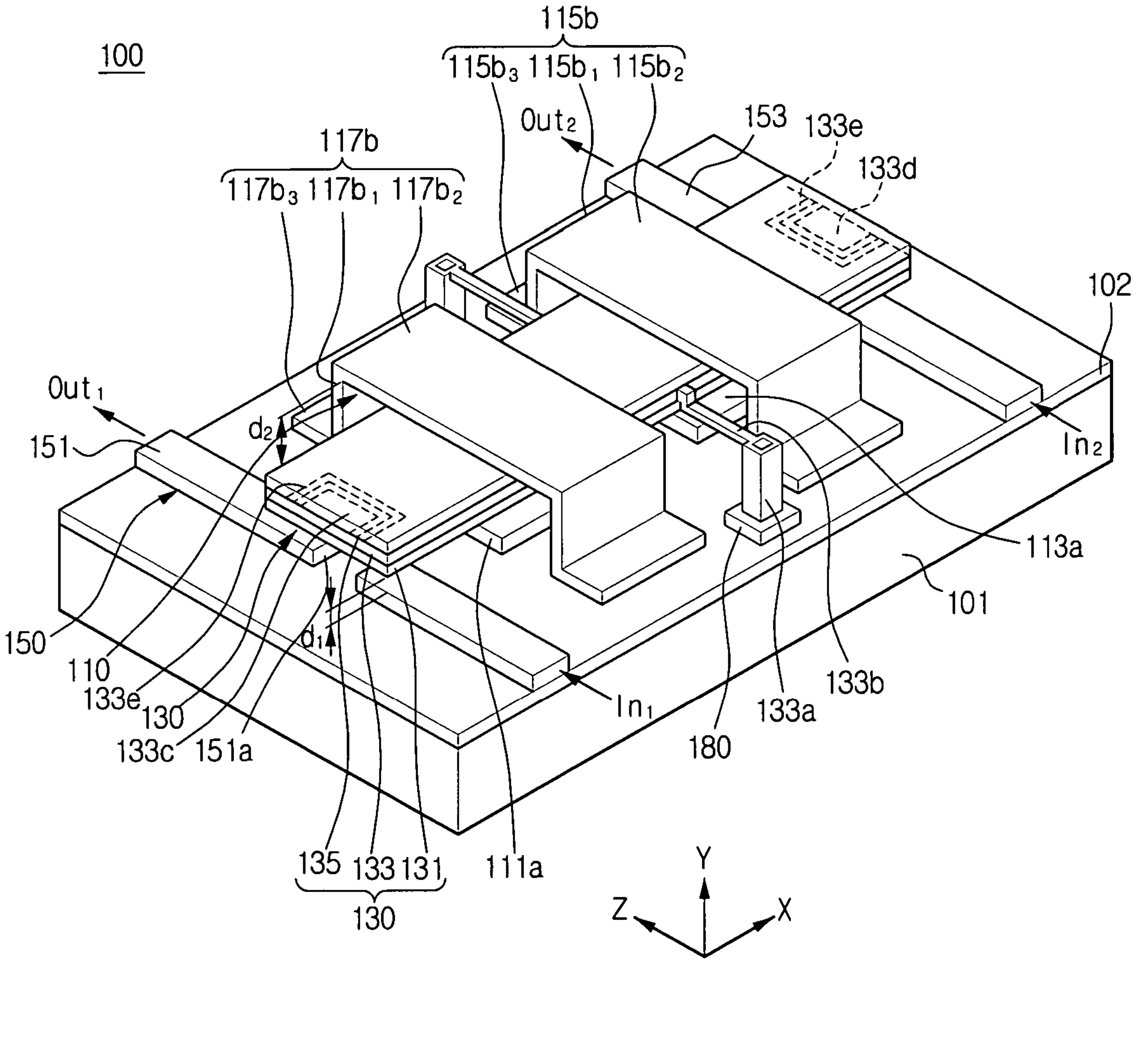
FIG. 1 is a schematic view of a micro electro-mechanical system (MEMS) switch in accordance with an exemplary embodiment of the present invention.

Hereinafter, the present invention will be described in detail by describing exemplary embodiments of the present invention with reference to accompanying drawings.

With reference to FIG. 1 to FIG. 3C, a micro electro-mechanical system (MEMS) switch 100 includes a substrate 101, an immovable electrode 110, a first and a second main electrodes 111*a*, 113*a*, first and second sub-electrodes 115*b*, 117*b*, an actuating beam 130, and a signal line 150 having first and second signal lines 151, 153.

Elements constituting the MEMS switch 100 will be described in more detailed below. On the substrate 101, first and second signal lines 151, 153 are formed with a distance between both of them. The first and second signal lines 151, 153 have first and second signal contact portions 151*a*, 153*a*, respectively, which are gaps formed to separate the corresponding signal lines into two pieces.

Between the first and the second signal lines 151, 153 spaced from each other by a distance, at least two main electrodes, a first main electrode 111*a* and a second main electrode 113$a$, are formed. The first and the second sub-electrodes 115$b$, 117$b$ are formed to face the first and second main electrodes 111$a$, 113$a$, respectively, and spaced from the main electrodes 111$a$, 113$b$, respectively. Here, the first main electrode 111$a$ and the first sub-electrode 115$b$ form a first electrode pair. The second main electrode 113$a$ and the second sub-electrode 117$b$ form a second electrode pair. That is, the first electrode pair composed of the first main electrode 111$a$ and sub-electrode 115$b$ is applied with a voltage at the same time, and the second electrode pair composed of the second main electrode 113$a$ and sub-electrode 117$b$ is applied with a voltage at the same time. The first and second sub-electrodes 115$b$, 117$b$ have support parts 115$b_1$, 117$b_1$, respectively, which are coupled to the substrate 101, and electrode parts 115$b_2$, 117$b_2$, respectively, which are spaced from the actuating beam 130 by a distance and extends in the perpendicular direction to the actuating beam 130. It is advantageous if the substrate 101 is further provided with contact pads 115$b_3$, 117$b_3$ which more stably can support lower parts of the corresponding support parts 115$b_1$, 117$b_1$, but also serve as pads, respectively, to be connected to an external power supply.

Further, the substrate 101 is provided with ground portions 180 in the middle portion thereof in the longitudinal direction. The spacers 133$a$ functioning like a pillar are disposed on the ground portions 180, respectively, to space the actuating beam 130 out from the top surface of the first and second main electrodes 111$a$, 113$a$ by a distance d1, thereby suspending the actuating beam 130. Each of the spacers 133$a$ is coupled to a spring arm 133$b$ at an upper end portion thereof to make the actuating beam perform a see-saw motion. Here, the spring arms 133$b$ are coupled to both middle sides of the actuating beam 130 at their different end portions, respectively. (See FIG. 1 and FIG. 3A)

The actuating beam 130 is a three-layer structure composed of a first dielectric layer 131, a metal layer 133, and a second dielectric layer 135. Here, the first and second dielectric layers 131, 135 are formed of silicon nitride and the metal layer 133 is formed of a conductive material, for example, Aluminum (Al). The spring arms 133$b$ extend from the metal layer 133 of the actuating beam 130 and each is coupled to a corresponding spacer 133$a$ at one end. Here, the metal layer 133 serving as the actuating beam 130, the spring arms 133$b$, and the spacers 133$a$ are formed by a single body which will be described below in more detail.

On one hand, a first contact portion 133$c$ and a second contact portion 133$d$ are provided near respective end portions of the metal layer 133 constituting a part of the actuating beam 130. The first and second contact portions 133$c$, 133$d$ are formed to penetrate the first dielectric layer 131, thereby coming into contact with the first and second switch contact portions 151$a$, 153$a$, respectively. Meanwhile, dielectric lines 133$e$ are further provided to electrically isolate the metal layer 133 constituting the actuating beam 130 from the first and second contact portions 133$c$, 133$d$, respectively. (See FIG. 2)

In this embodiment, the spring arms 133$b$ are formed of a three-layer structure but it may be advantageous to form the spring arms 133$b$ of a single metal layer 133 to more elastically support the actuating beam, thereby helping the actuating beam dynamically move like a see-saw motion.

As described above, it is possible to achieve thermal stability of a micro-structure by implementing the actuating beam 130 with the three-layer structure, and improve the dielectric effect between the first main electrode 111$a$ and the first sub-electrode 115$a$, and between the second main electrodes 113$a$ and the second sub-electrode 117$b$.

The substrate 101 further may be provided with a dielectric layer 102 thereon to increase the dielectric effect.

The operation principle of the MEMS switch 100 above will be described below in more detail.

Figure 4A:
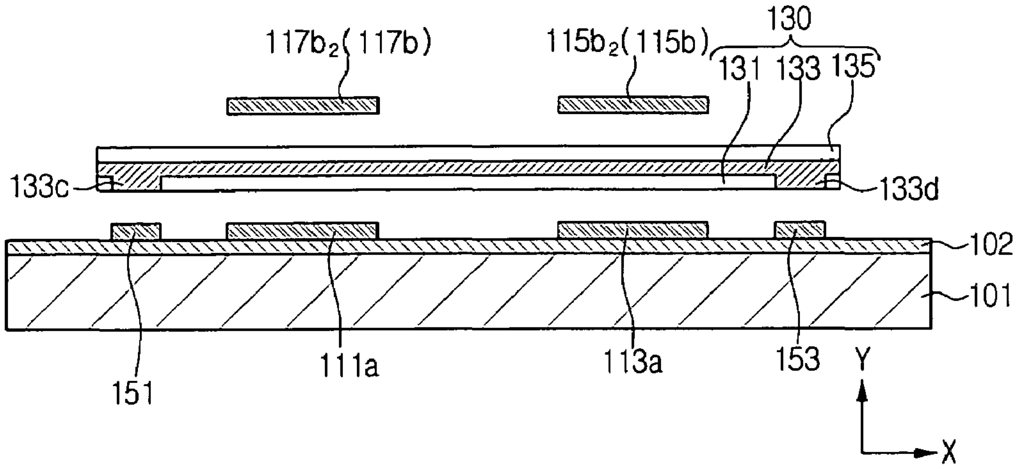
FIG. 4A is a cross-sectional view of the MEMS switch, which is taken along the line V-V' in FIG. 2.

Referring to FIG. 4A, in case that any electrode of the first and second main electrodes 111$a$, 113$a$ and the first and second sub-electrodes 115$b$, 117$b$ is applied with a voltage, the actuating beam stays horizontally.

Figure 4B:
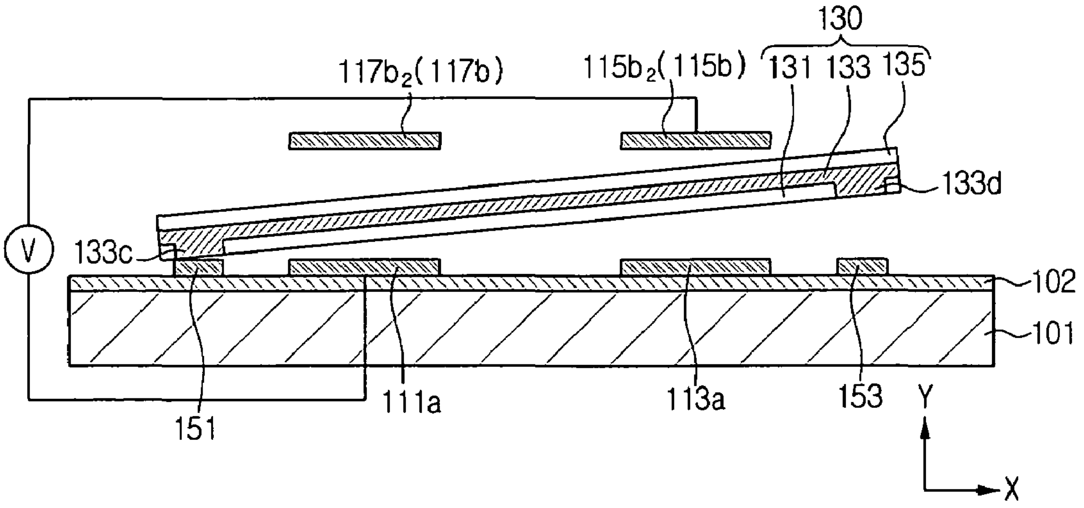
FIG. 4B and FIG. 4C are views showing movements of an MEMS switch in accordance with an exemplary embodiment of the present invention.

Next, with reference to FIG. 4B, when a voltage is applied to the first main electrode 111$a$ and the first sub-electrode 115$b$, a space between the first main electrode 111$a$ and the actuating beam 130 is charged with electricity, and the actuating beam 130 is attracted toward the substrate 101. Accordingly, the first contact portion 133$c$ of the actuating beam 130 comes into contact with the first signal contact portion 151$a$ of the first signal line 151. By this contact, an external signal input through an input terminal $In_1$ of the first signal line 151 is output through an output terminal $Out_1$ (See FIG. 1)

Meanwhile, while the one end of the actuating beam 130 is in contact with the first signal contact portion 151$a$, the other end is charged with electricity as the charging occurs between the first sub-electrode 115$b$ and the other end of actuating beam 130. Accordingly, the other end of the actuating beam 130 is attracted to the electrode parts 115$b_2$ of the first sub-electrode 115$b$ by an electrostatic force.

Figure 2:
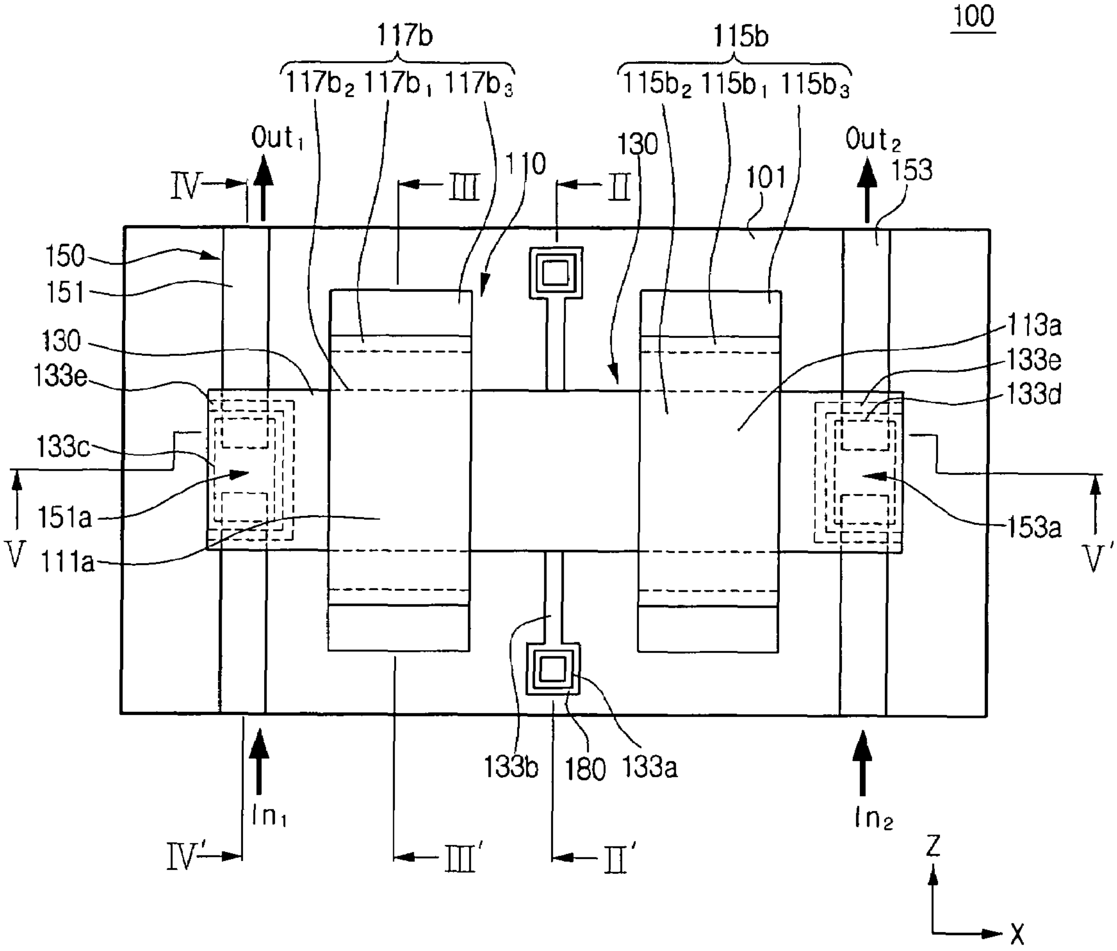
FIG. 2 is a plan view of the MEMS switch shown in FIG. 1.
Figure 3A:
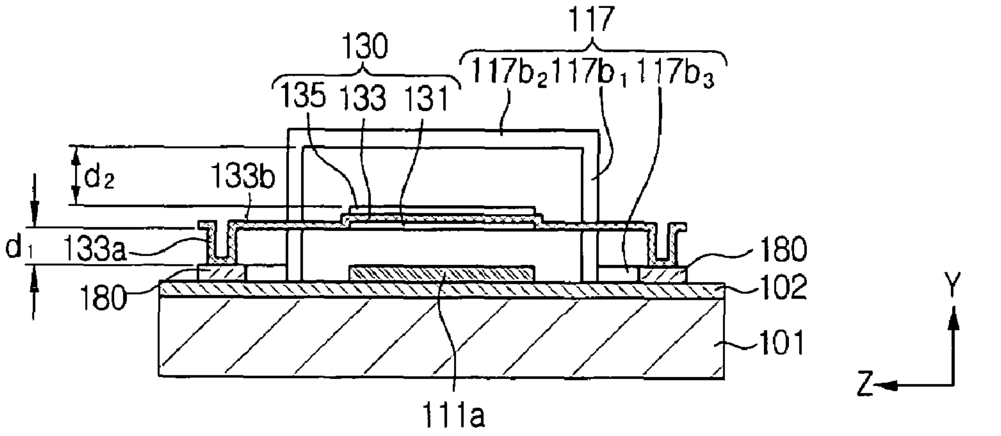
FIG. 3A to 3C are cross-sectional views of the MEMS switch, which are taken along the lines II-II', III-III' and IV-IV' in FIG. 2, respectively.
Figure 3B:
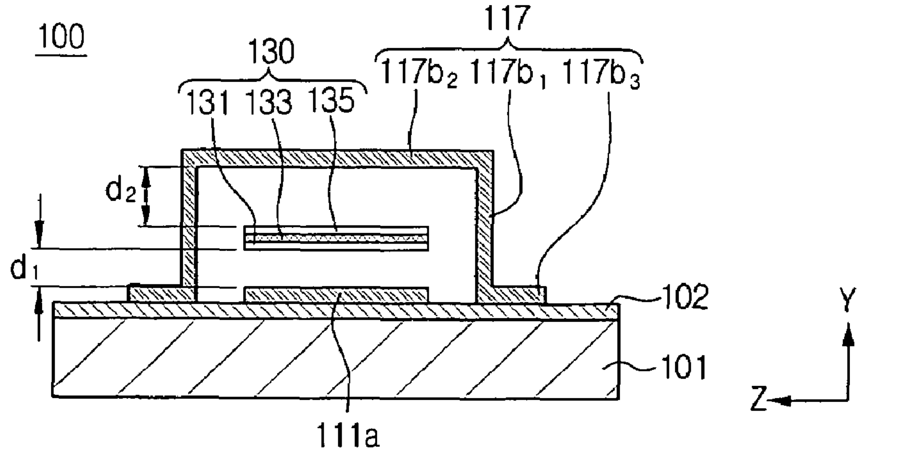
Figure 3C:
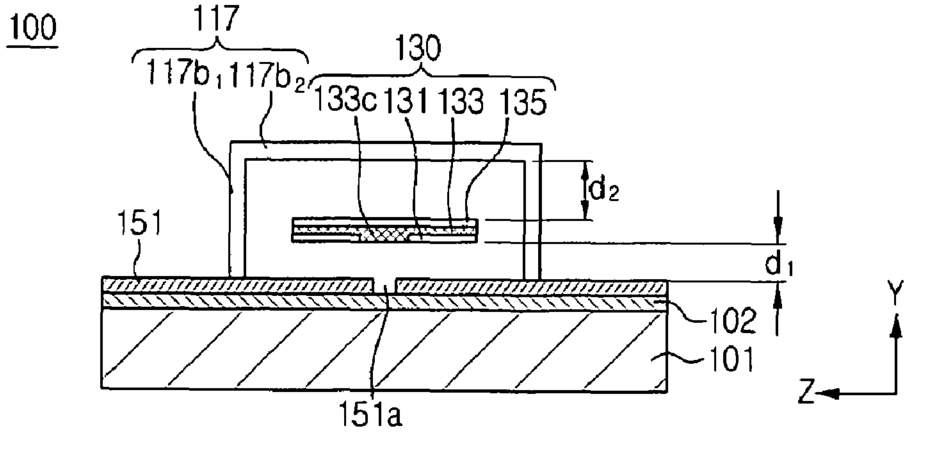
Figure 4C:
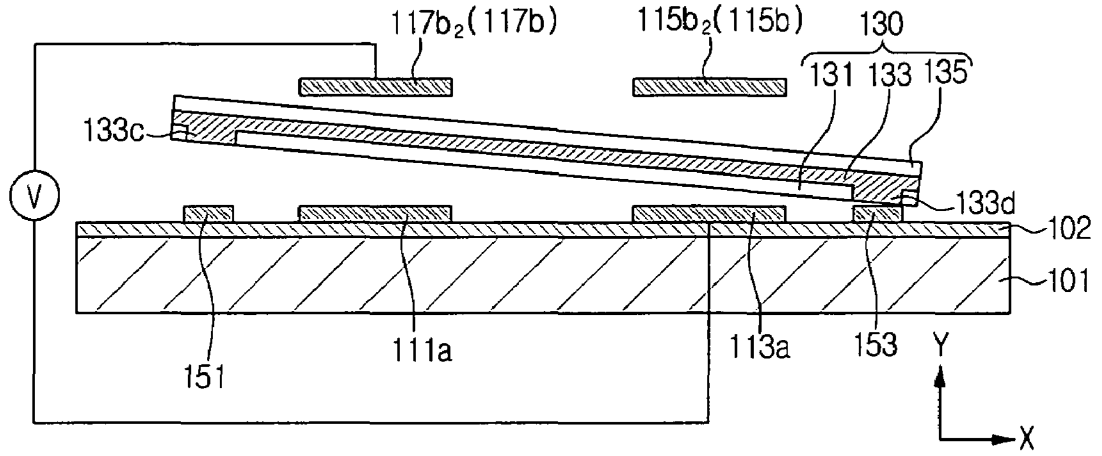
Figure 5A:
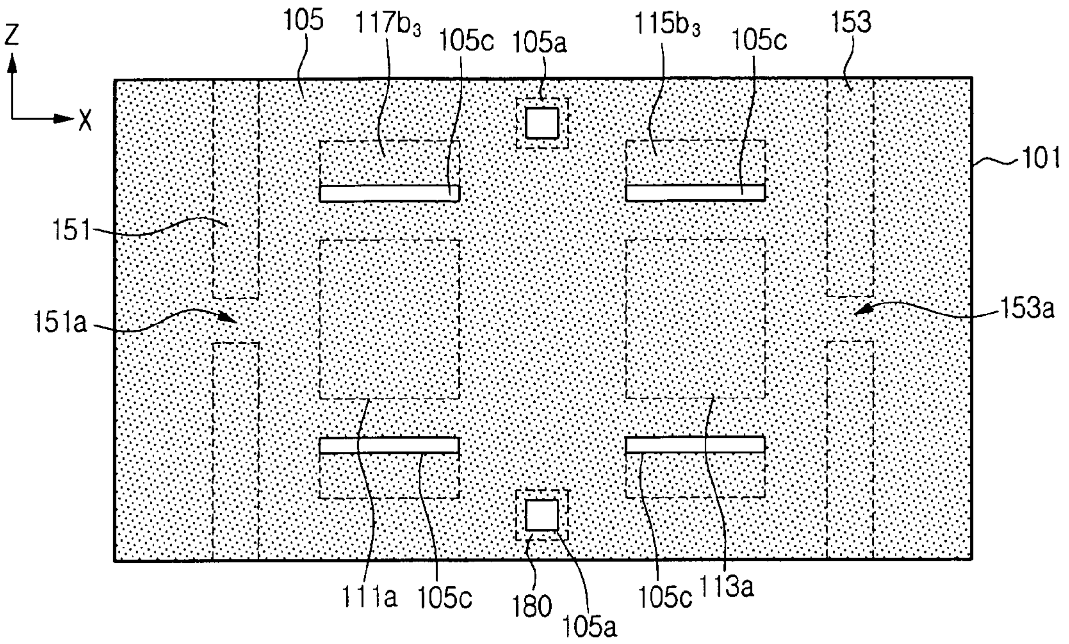
FIG. 5A to FIG. 5E are plan views showing process steps in a method of manufacturing the MEMS switch in accordance with an exemplary embodiment of the present invention.
Figure 5B:
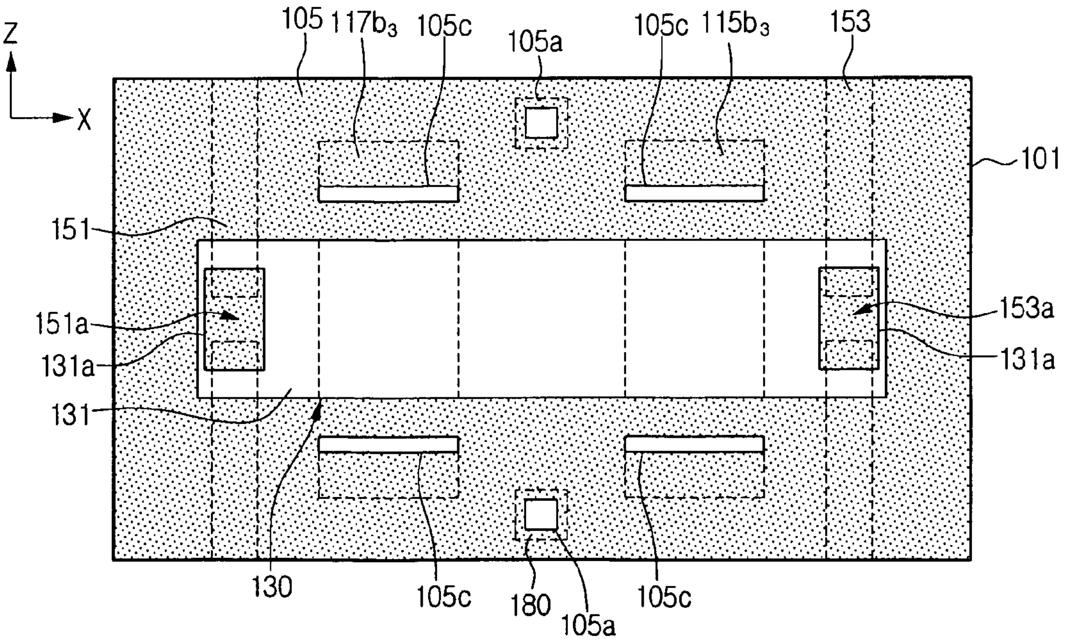
Figure 5C:
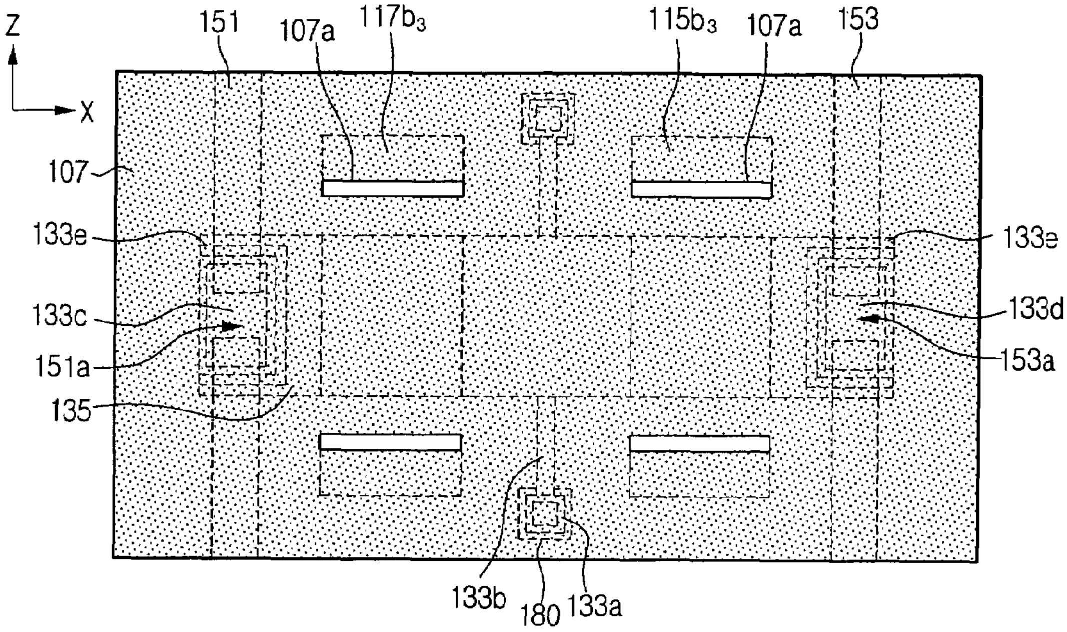
Figure 5D:
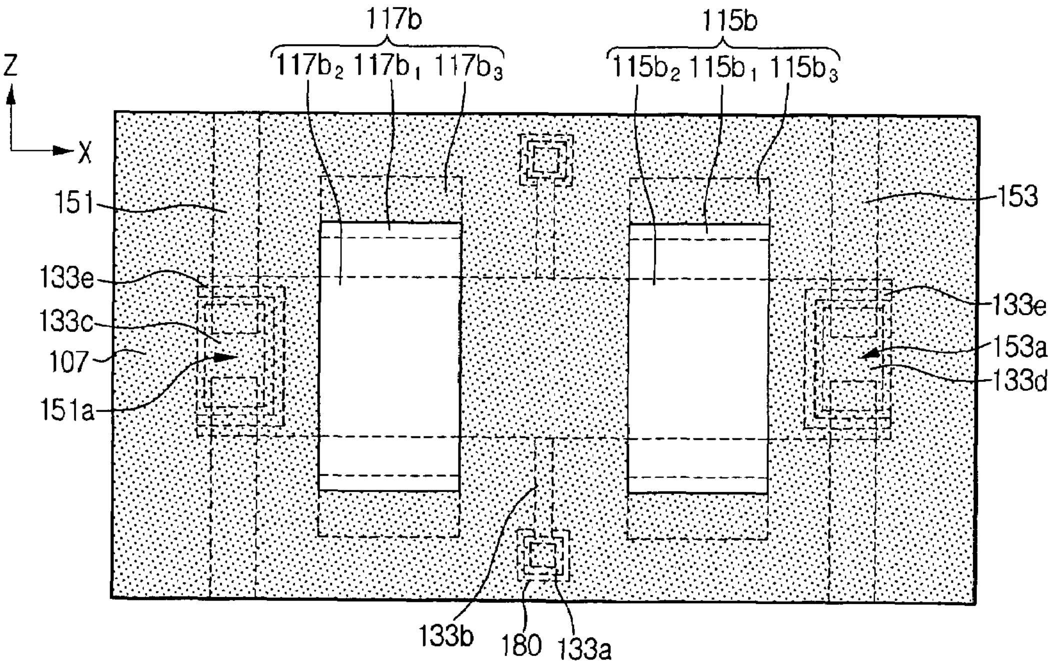
Figure 5E:
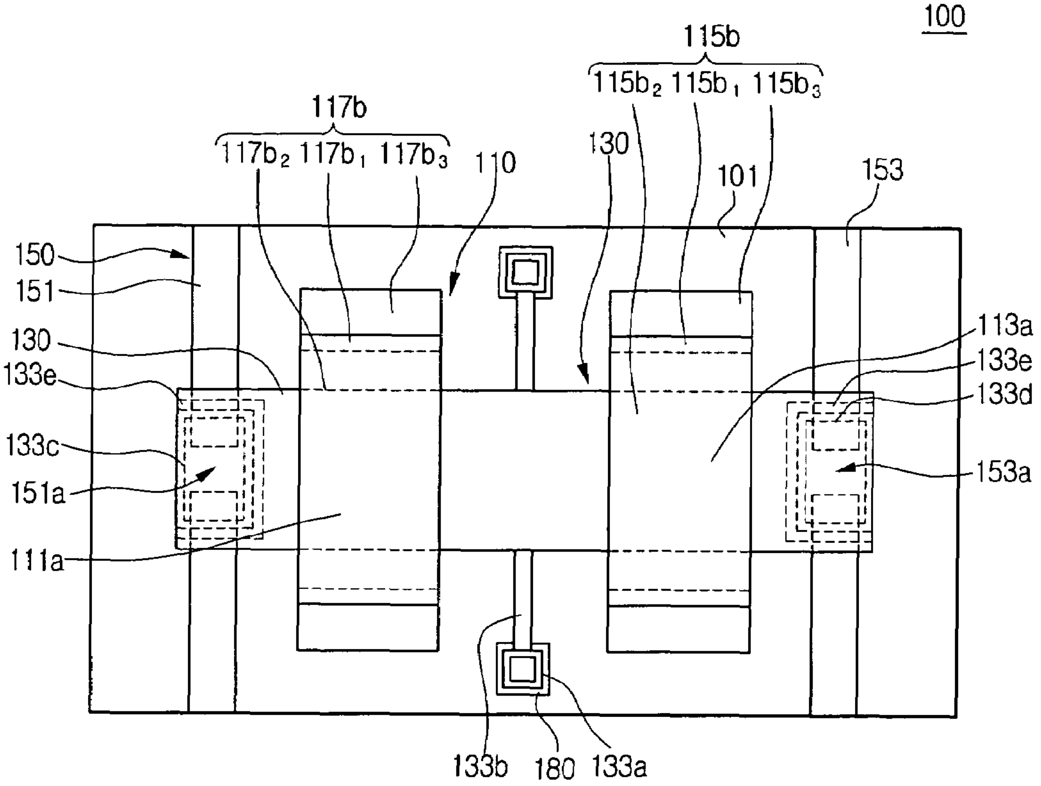
Figure 6A:
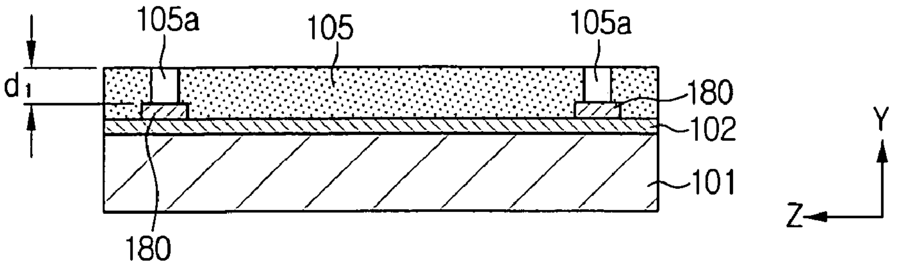
FIG. 6A to FIG. 6E are cross-sectional views taken along the line II-II' in FIG. 2 to show a method of manufacturing the MEMS switch in accordance with an exemplary embodiment of the present invention.
Figure 6B:
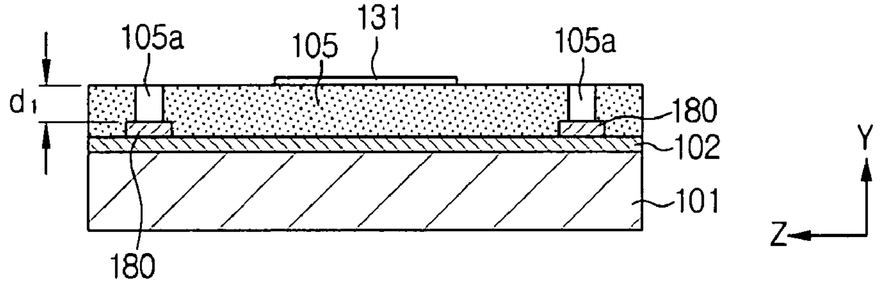
Figure 6C:
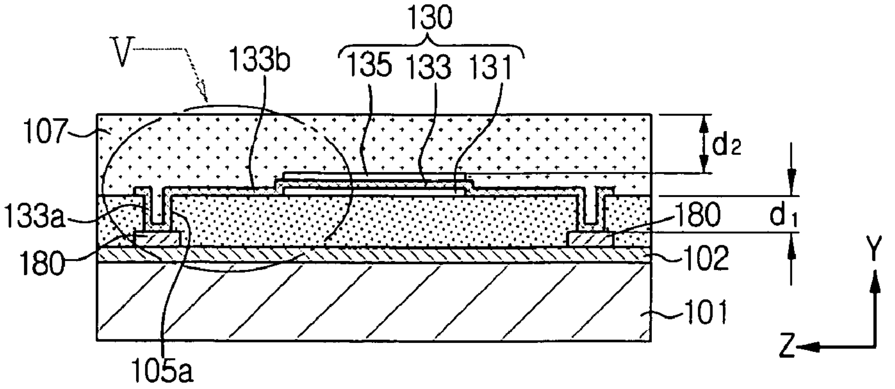
Figure 6D:
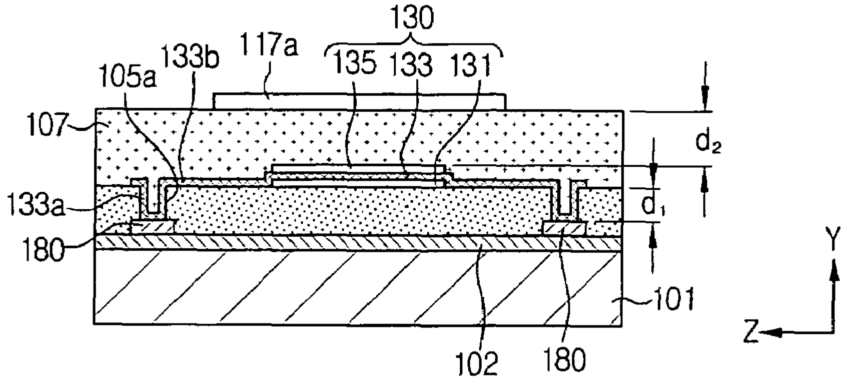
Figure 6E:
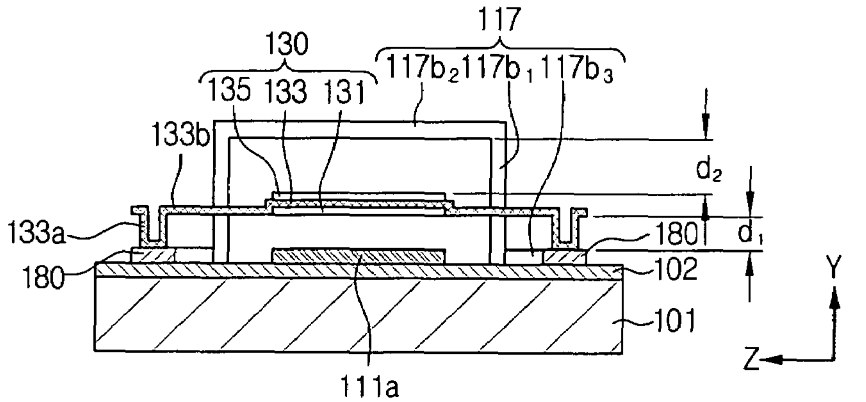
Figure 6F:
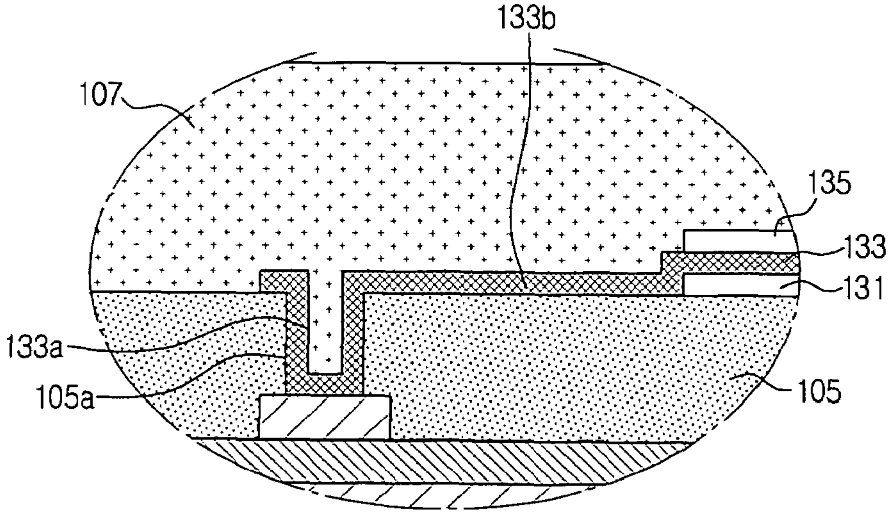
FIG. 6F is an enlarged view of a part denoted by reference roman numerical IV shown in FIG. 6C.
Figure 7A:
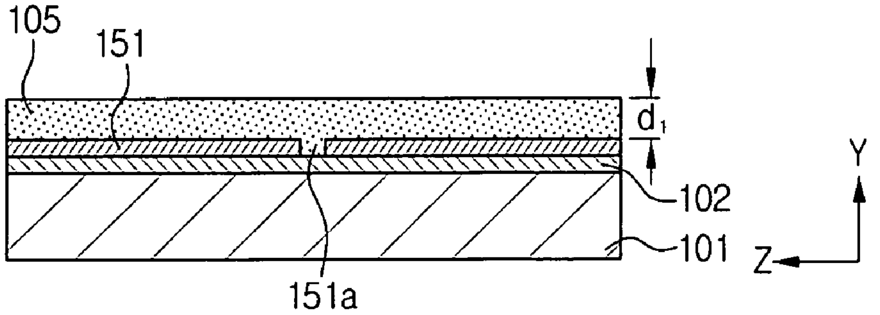
FIG. 7A to FIG. 7E are cross-sectional views showing a method of manufacturing the MEMS switch in accordance with an exemplary embodiment of the present invention, where the views are taken along the line III-III' shown in FIG. 2.
Figure 7B:
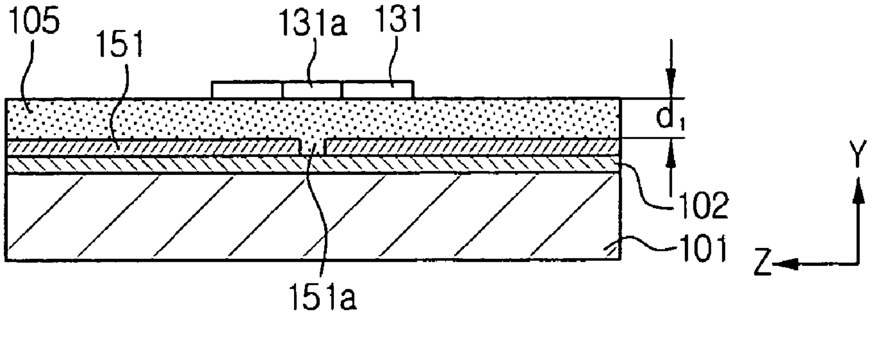
Figure 7C:
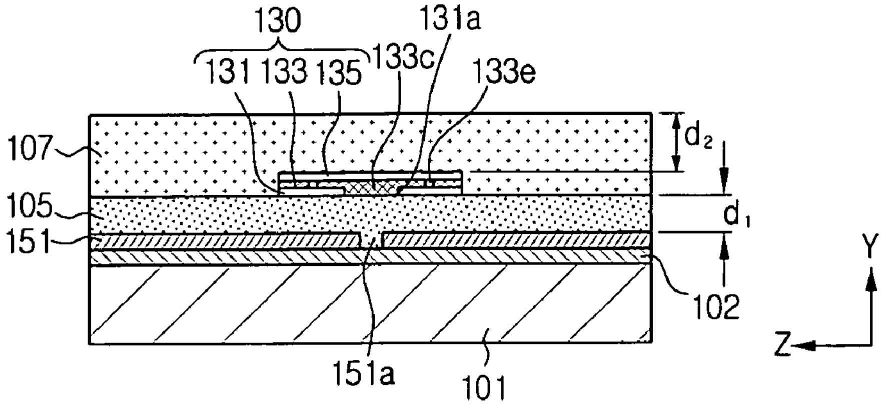
Figure 7D:
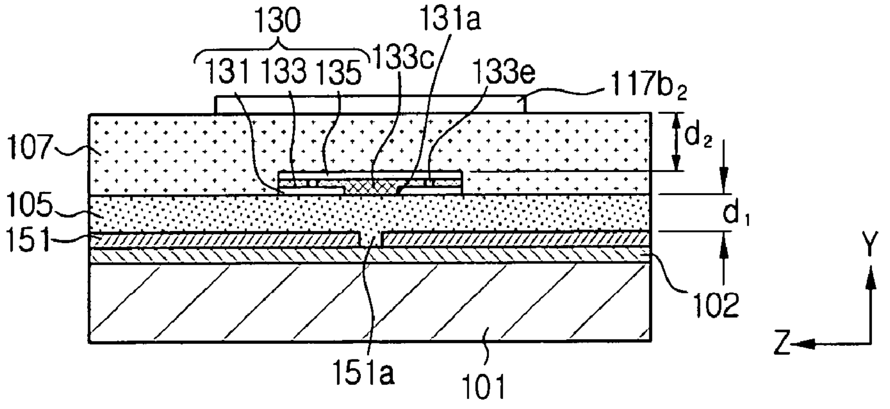
Figure 7E:
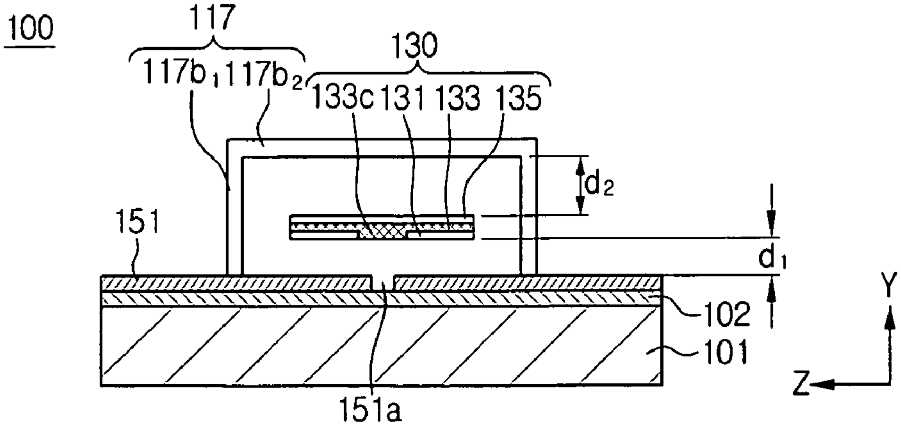
Figure 8A:
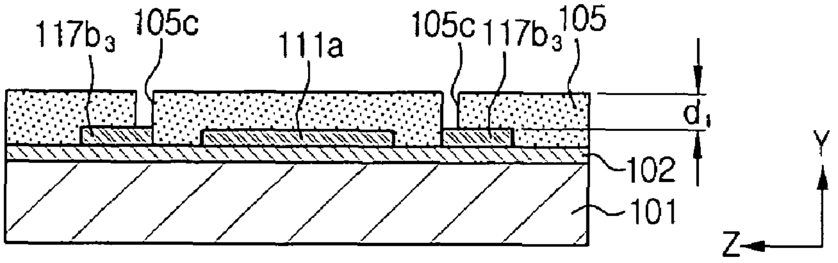
FIG. 8A to FIG. 8E are cross-sectional views showing a method of manufacturing the MEMS switch in accordance with an exemplary embodiment of the present invention, where the views are taken along the line IV-IV'.
Figure 8B:
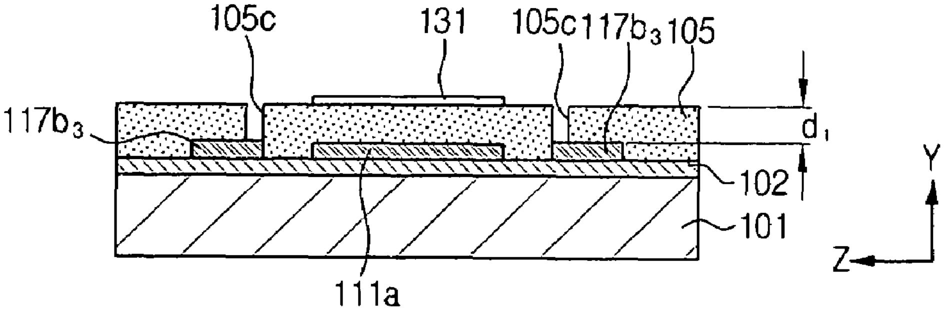
Figure 8C:
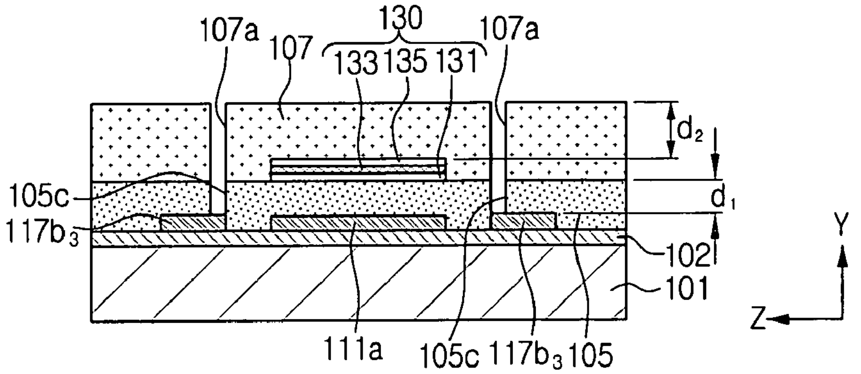
Figure 8D:
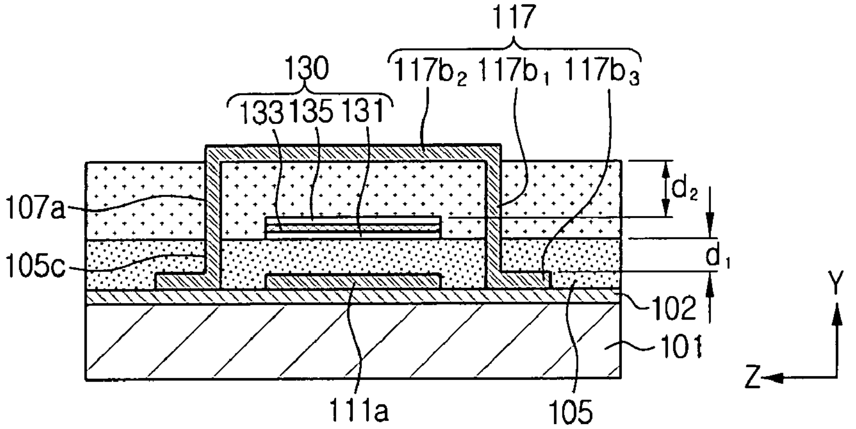
Figure 8E:
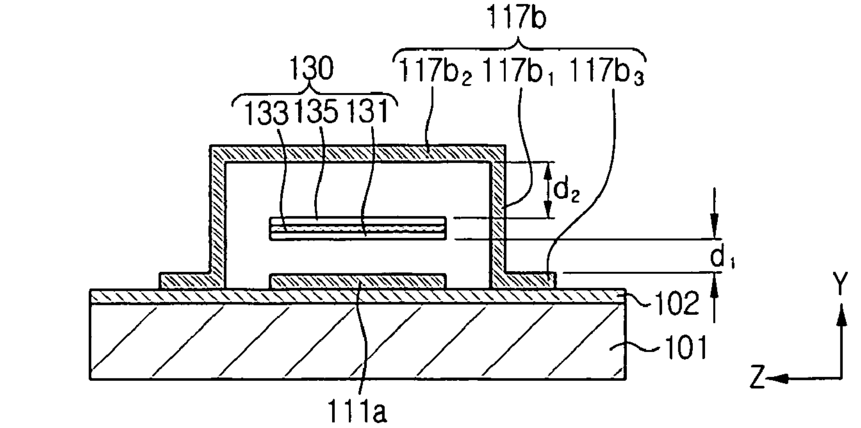

With reference to FIG. 4C, when a voltage is applied to the second main electrode 113$a$ and the second sub-electrode 117$b$, one end of the actuating beam 130, i.e. the second contact portion 133$d$ comes into contact with the second signal contact portion 153$a$ (See FIG. 2). In the same manner as the movement of the first contact portion 133$c$ described above, the other end is attracted toward the electrode part 117$b_2$ of the second sub-electrode 117$b$. Accordingly, the second contact portion 133$d$ of the actuating beam 130 comes into contact with the second signal contact portion 153$a$ and the external signal input through an input terminal $In_2$ is output through an output terminal $Out_2$.

Next, a method of manufacturing the MEMS switch 100 above will be described below.

With reference to FIGS. 5A, 6A, 7A, and 8A, the substrate 101 is prepared and the dielectric layer 102 is deposited on the substrate 101. In the case where the substrate 101 is a silicon wafer with high resistivity, the dielectric layer 102 may not be formed. Here, the dielectric layer 102 can be formed by a thermal oxidation process in which the surface of a silicon wafer is oxidized in high temperature oxygen ambient, thereby forming a silicon dioxide layer $SiO_2$. Alternately, other oxidation processes known in the art may be used.

Next, a conductive material such as gold Au is deposited on the first dielectric layer 102, and then layers on the substrate 101 are patterned to form a first main electrode 111$a$, a second main electrode 113$a$, a first signal line 151, a second signal line 153, ground portions 180, a first sub-electrode 115$b$, a second sub-electrode 117$b$, a first contact pad 115$b_3$ and a second contact pad 117$b_3$. A part of the first and second signal lines 151 and 153 is separated to thus form the first and second signal contact portions 151$a$ and 153$a$ (See FIG. 5A). The first and second main electrodes 111$a$ and 113$a$, the first and second signal lines 151 and 153, the ground portions 180, and the first and second contact pads 115$b_3$ and 17$b_3$ may be patterned by wet-etching process.

Next, a first sacrificial layer 105 is applied over the substrate provided with the first and second main electrodes 111$a$, 113$a$, the first and second signal lines 151, 153, the ground portions 180, and the first and second contact pads 115$b_3$, 117$b_3$. The first sacrificial layer 105 has a certain thickness, which may be a predetermined thickness, corresponding to a distance d1 by which the actuating beam 130 and the top surfaces of the first and second main electrodes 111*a*, 113*a* are spaced. Here, actuating beam support holes 105*a* are patterned out to expose the ground portions 180 therethrough (See FIG. 5A and FIG. 6A), and sub-electrode contact holes 105*c* are patterned out to expose the first and second contact pads 115*b*$_3$, 117*b*$_3$. (See FIG. 5A and FIG. 8A). The first sacrificial layer 105 may be formed of photoresist by a spin coating process or a spray coating process. Alternately, other processes known in the art may be used. Here, the actuating beam support holes 105*a* and the sub-electrode contact holes 105*c* may be patterned out by a photolithography process for example.

With reference to FIGS. 5B, 6B, 7B and 8B, a first dielectric layer 131 is formed on the first sacrificial layer 105 and patterned to form a dielectric layer shape corresponding to the actuating beam 130. The ground portions 180 exposed through the actuating beam support holes 105*a* and the first and second contact pads 115*b*$_3$, 117*b*$_3$ exposed through the sub-electrode contact holes 105*c* are still exposed through the first dielectric layer 131. At both end portions of the first dielectric layer 131 having the actuating beam shape, contact member through holes 131*a* are patterned out (See FIG. 5B and FIG. 7B). The first dielectric layer 131 serves as an isolator between the actuating beam 130 and the first and second main electrodes 111*a*, 113*a*. Here, the first dielectric layer 131 may be formed of a silicon nitride (SiN) layer, and it may be deposited by a plasma enhanced chemical deposition (PECVD) process. The PECVD process is usually carried out at a high ambient temperature such as 300° C. However, in this embodiment, the PECVD process is advantageous in that it is carried out at a low temperature, about 150° C., to prevent burning of the first sacrificial layer 105. Further, the patterning out may be performed by a dry etching process.

With reference to FIG. 5C, FIG. 6C, FIG. 6F, FIG. 7C and FIG. 8C, a metal layer 133 of conductive material such as Aluminum Al is deposited on the first dielectric layer 131 by a sputtering process. Some portions of the metal layer 133 come into contact with the ground portions 180 via the actuating beam support holes 105*a*, forming spacers 133*a*. (See FIG. 5C, FIG. 6C and FIG. 6F). Further, as the metal layer 133 is buried in the contact member through holes 131*a*, the buried portions of the metal layer 133 form the first and second contact portions 133*c*, 133*d* (See FIG. 5C and FIG. 7*c*). Here, to electrically isolate the first and second contact portions 133*c*, 133*d* from the actuating beam 130, it is advantageous to further form the dielectric line 133*e* on a portion of the metal layer 133, which corresponds to the actuating beam. (See FIG. 5C, FIG. 7C and FIG. 7F). The metal layer 133 is patterned so as to form the shape of the actuating beam 130. The spacers 133*a* and the spring arms 133*b* connected to both sides of the metal layer 133 constituting the actuating beam 130 are formed by the patterning process (See FIG. 5C and FIG. 6C). Such patterning may be performed by a dry etching process.

Next, a second dielectric layer 135 is deposited and patterned to form the shape of the actuating beam 130. The second dielectric layer 135 is formed to electrically isolate the actuating beam 130 from the first and second sub-electrodes 115*b*, 117*b*. Here, the second dielectric layer may be formed of silicon nitride the same as the first dielectric layer 131 by a PECVD process.

As described above, the actuating beam 130 has a three-layer structure composed of the first dielectric layer 131, the metal layer 133 and the second dielectric layer 135, so that actuating beam 130. This structure helps to protect the actuating beam 130 from thermal distortion.

Next, a second sacrificial layer 107 is deposited on the first sacrificial layer 105 and patterned to have the shape of the actuating beam 130. Here the second sacrificial layer 107 has a thickness corresponding to a distance d2 to make the first and second sub-electrodes 115*b*, 117*b* and the top surface of the actuating beam 130 be spaced by the distance d2 (See FIG. 6). The second sacrificial layer 107 has second sub-electrode contact holes 107*a* to expose the first and second contact pads 115*b*$_3$, 117*b*$_3$ therethrough, and the sacrificial layer 107 may be coated by a spin coating process or a spin spraying process in the same manner as the formation of the first sacrificial layer 105. Further, the second sub-electrode contact holes 107*a* may be formed by a photolithography process (See FIG. 5C and FIG. 8C).

With reference to FIG. 5D, FIG. 6D, FIG. 7D and FIG. 8*d*, a sub-electrode layer (not shown) is deposited on the second sacrificial layer 107, and then patterned to form the first and second sub-electrodes 115*b*, 117*b*. Here, the sub-electrode layer fills, i.e. plugs, the sub-electrode contact holes 105*a*, 107*b*, thereby forming the support parts 115*b*$_1$, 117*b*$_1$ by the plugs formed in the sub-electrode contact holes 105*a*, 107*a*. The support parts 115*b*$_1$, 117*b*$_1$ come into contact with the contact pads 115*b*$_3$, 117*b*$_3$ at the bottom thereof. Further, after patterning the sub-electrode layer, the first and second electrode parts 115*b*$_2$, 117*b*$_2$ are formed (See FIG. 5D and FIG. 8D)

With reference to FIG. 5E, FIG. 6E, FIG. 7E and FIG. 8E, the remaining first and second sacrificial layers 105, 107 are removed, and the MEMS switch manufacturing processes are completed. The first and second sacrificial layers 105, 107 may be removed by an $O_2$ microwave plasma ashing process.

In accordance with exemplary embodiments of the present invention, the MEMS switch described above is advantageous in that the electrode area increases by using the first and second sub-electrodes, so that the MEMS switch can operate at low power.

Moreover, since the actuating beam has a three-layer structure, the thermal stability thereof increases and short circuits are prevented between electrodes.

Although exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A micro electro-mechanical system (MEMS) switch, comprising:

a substrate;

at least two signal lines formed on the substrate, wherein each of the at least two signal lines has a signal contact portion;

at least two main electrodes spaced from each other by a distance and formed over the substrate, the at least two main electrodes disposed between the signal lines and spaced from the signal lines;

an actuating beam installed above the at least two main electrodes at a certain height;

a support unit which is configured to support the actuating beam; and at least two sub-electrodes formed above the actuating beam with a distance between each of the at least two sub-electrodes and the actuating beam, and arranged to face the corresponding main electrodes.

2. The MEMS switch as claimed in claim 1, wherein the actuating beam acts like a lever and the support unit acts like a fulcrum of the lever and enable the actuating beam to move.

3. The MEMS switch as claimed in claim 1, wherein the support unit comprises spring arms projected from both sides of the actuating beam in a middle portion in a longitudinal direction, and spacers coupled to the spring arms, respectively, and vertically formed on the substrate at the certain height.

4. The MEMS switch as claimed in claim 1, wherein the actuating beam has a multi-layer structure including a first dielectric layer, a metal layer and a second dielectric layer.

5. The MEMS switch as claimed in claim 4, wherein the support unit includes spring arms extend from the metal layer, and spacers are coupled to the spring arms, respectively, vertically formed on the substrate at the certain height.

6. The MEMS switch as claimed in claim 5, wherein the substrate further comprises a ground portion which supports a lower part of each of the spacers and grounds the actuating beam.

7. The MEMS switch as claimed in claim 4, wherein each of the first and second dielectric layers is formed of silicon nitride SiN.

8. The MEMS switch as claimed in claim 4, wherein the metal layer is formed of aluminum.

9. The MEMS switch as claimed in claim 1, wherein the substrate comprises a silicon wafer.

10. The MEMS switch as claimed in claim 9, wherein the substrate further comprises a dielectric layer.

11. The MEMS switch as claimed in claim 10, wherein the dielectric layer is a silicon dioxide $SiO_2$ layer.

12. The MEMS switch as claimed in claim 4, wherein the metal layer has a portion buried in the first dielectric layer, thereby forming a contact portion to be in contact with one of the signal contact portions.

13. The MEMS switch as claimed in claim 12, wherein a dielectric line is further provided to cover the contact portion, thereby isolating the metal layer from the contact portion.

14. The MEMS switch as claimed in claim 1, wherein the signal lines, the main electrodes and the sub-electrodes are formed of gold.

15. The MEMS switch as claimed in claim 1, wherein each of the at least two sub-electrodes comprises:

a plurality of support parts vertically formed on the substrate with the certain height at both sides of actuating beam; and electrode parts supported by the support parts and formed perpendicular to the actuating beam.

16. The MEMS switch as claimed in claim 15, wherein the substrate is further provided with a contact pad thereon, with which the support part comes into contact.

* * * * *